Nov. 8, 1955  K. M. FEIERTAG  2,723,359
DYNAMOELECTRIC MACHINE STATOR ASSEMBLY
Filed Dec. 17, 1952
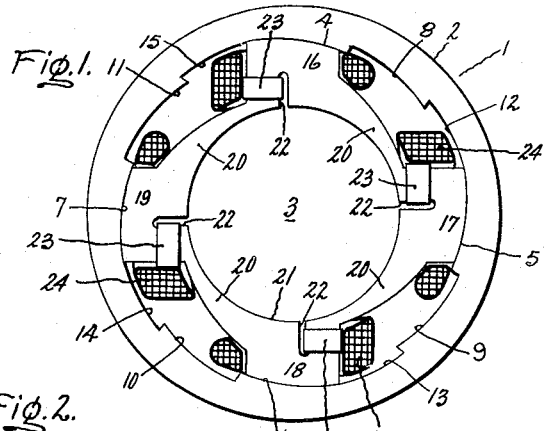
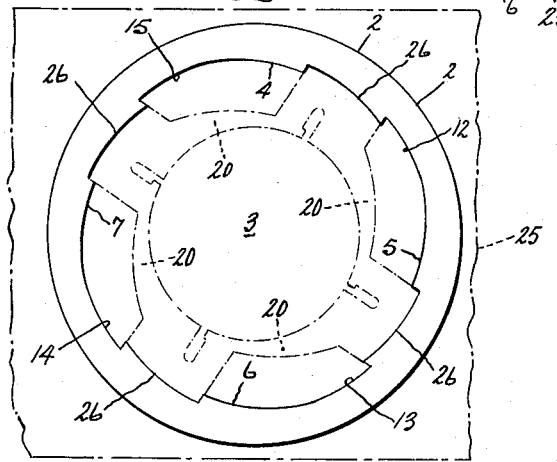
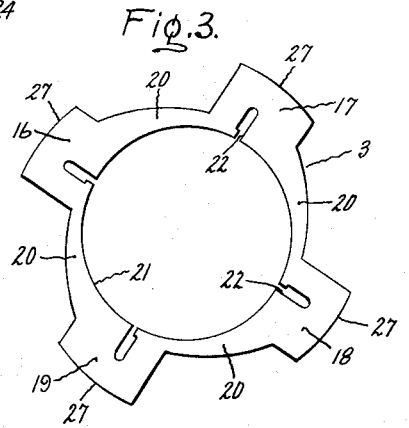
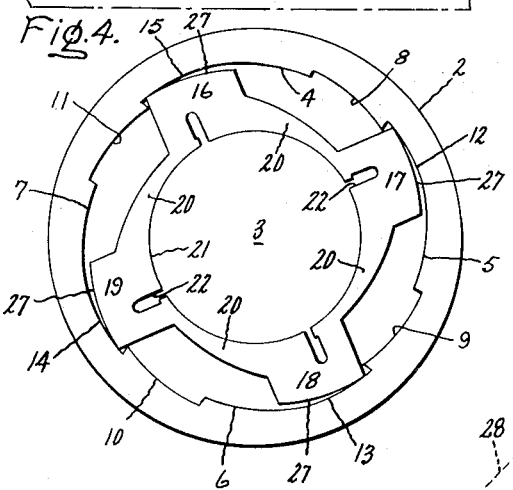
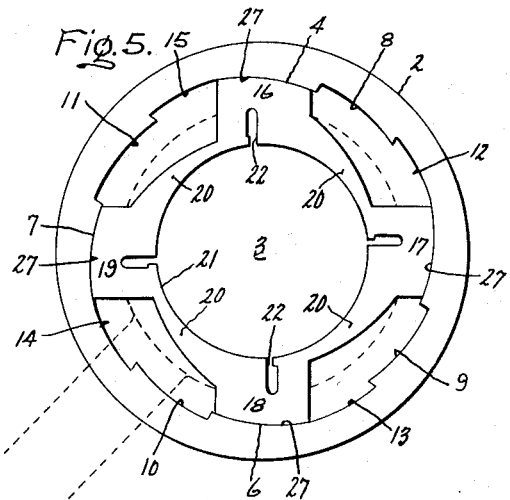
Inventor:
Karl M. Feiertag,
by Robert G. Iris
His Attorney.

United States Patent Office 2,723,359
Patented Nov. 8, 1955

2,723,359

DYNAMOELECTRIC MACHINE STATOR ASSEMBLY

Karl M. Feiertag, Fort Wayne, Ind., assignor to General Electric Company, a corporation of New York Application December 17, 1952, Serial No. 326,540

9 Claims. (Cl. 310—254)

This invention relates to stator assemblies for dynamoelectric machines.

Heretofore, the stator assemblies of small induction motors of the shaded pole type, for example fan motors, have consisted of four pole pieces having their inner ends connected by bridging portions and their outer ends connected by a circular yoke. Since the inner ends of the pole pieces are connected by bridging portions, the four pole pieces can be punched out of the center of the yoke ring as a separate piece. After punching, the yoke ring laminations and the pole piece laminations are stacked and secured separately and pre-wound field coils are then positioned on the pole pieces. The stator is finally assembled by pressing the pole piece laminations with the field coils thereon back into the circular yoke member. It has been found, however, that in punching out the pole piece laminations from the center of the yoke laminations; a certain amount of stretching of the lamination metal occurs. As a result, the outside diameter of the pole piece member is greater than the inside diameter of the yoke member thus requiring a grinding operation on the outside of the pole piece laminations. It is therefore desirable to provide a dynamoelectric machine stator assembly of the type described above which can be readily assembled without the above mentioned grinding operation.

An object of this invention is to provide an improved dynamoelectric machine stator assembly incorporating the desirable feature set forth above.

In accordance with this invention, a stator assembly is provided comprising an outer yoke member and a pole piece member arranged therein, the inner periphery of the yoke member having at least two spaced apart spiral surfaces formed thereon, these surfaces being spiraled in the same direction. The pole piece member has at least two spaced apart pole pieces with their inner ends being connected by bridging portions and with their outer ends being spiraled in the same direction and respectively engaging the spiral surfaces of the yoke member. The method of making this assembly comprises the steps of punching a yoke member lamination and a pole piece member lamination from the center of the yoke member lamination with spiral cuts respectively separating the outer ends of pole pieces of the pole piece member lamination from the inner periphery of the yoke member lamination and with spiral surfaces being formed on the inner periphery of the yoke member lamination intermediate the spiral cuts. The yoke member laminations and pole piece member laminations are respectively stacked and field windings are positioned on the pole pieces. The pole piece member laminations are then positioned within the bore of the yoke member laminations and then rotated so that the spiraled pole piece ends are in engagement with the spiral surfaces on the inner periphery of the yoke member laminations.

Further objects and advantages of this invention will become apparent and the invention will be better understood by reference to the following description and the accompanying drawings, and the features of novelty which characterize this invention will be pointed out with particularity in the claims annexed to and forming a part of this specification.

In the drawing,

Fig. 1 is a side elevational view, partly in section, illustrating the improved dynamoelectric machine stator assembly of this invention;

Fig. 2 is a view illustrating the punching of the pole piece lamination from the center of the yoke lamination;

Fig. 3 is a view of a pole piece member lamination;

Fig. 4 is a view showing the initial assembly of the pole piece member laminations within the yoke member laminations; and Fig. 5 shows the rotation of the pole piece member laminations into their ultimate position within the yoke member laminations.

Referring now to Fig. 1, there is shown a dynamoelectric machine stator assembly generally identified as 1 comprising a yoke member 2 formed of a plurality of relatively thin laminations of magnetic material and a pole piece member generally identified as 3 also formed of a plurality of relatively thin laminations of magnetic material. The yoke member 2 has four equally spaced spiral surfaces 4, 5, 6 and 7 formed on its inner surface, these surfaces all being spiraled in the same direction. The inner periphery of yoke member 2 also has four other spiral surfaces 8, 9, 10 and 11 and four equally spaced arcuate surfaces 12, 13, 14 and 15, for a purpose to be hereinafter described. The pole piece member includes four equally spaced pole pieces 16, 17, 18 and 19 having their inner ends joined by bridging members 20 thus defining bore 21 for reception of the rotor of the machine (not shown). The outer ends of the pole pieces 16, 17, 18 and 19 are spiraled in the same direction and respectively engage spiral surfaces 4, 5, 6 and 7 of yoke member 2. Suitable radial shading coil slots 22 are formed in pole pieces 16, 17, 18 and 19 with shading coils 23 being positioned therein. Preformed field coils 24 embrace pole pieces 16.

Referring to Figs. 2, 3, 4 and 5, the method of making the stator assembly of Fig. 1 will now be described. Referring first to Fig. 2, a blank 25 of suitable lamination material is provided from which yoke member 2 and pole piece member 3 is punched. It will be readily seen that pole piece member 3 is punched from the center of yoke member 2 with spiral cuts 26 separating yoke member 2 from pole pieces 16, 17, 18 and 19. In this punching operation, as will be hereinafter more fully described, the spiral cuts 26 ultimately form the spiral surfaces 27 on the outer ends of pole pieces 16, 17, 18 and 19 and the unused spiral surfaces 8, 9, 10 and 11 of the assembled device shown in Fig. 1. Also formed in the punching operation are spiral surfaces 4, 5, 6, and 7 and arcuate surfaces 12, 13, 14 and 15.

After the punching operation, the pole piece laminations have the appearance of Fig. 3 with pole pieces 17, 18, 19 and 20 being joined by bridging portions 20 defining bore 21 and with their outer surfaces 27 being spiraled in the same direction as shown. The yoke member laminations 2 and pole piece member laminations 3 are then separately stacked and secured together in any suitable manner and the preformed coils 24 are then assembled on the pole pieces 16, 17, 18 and 19. The pole piece member laminations 3, with the coils 24 therein, are then positioned in the bore of yoke member 2 as shown in Fig. 4. It will now be seen that the spiraled end surfaces 27 of pole pieces 16, 17, 18 and 19 are in registry with arcuate surfaces 12, 13, 14 and 15 of yoke member 2 intermediate the spiral surfaces 8, 9, 10 and 11 formed by the spiral cuts 26 and the other spiral surfaces 4, 5, 6 and 7. It will be readily understood that the preformed coils 24 are not, for simplicity's sake, shown in Figs. 3, 4 and 5.

After pole piece member 3 with the preformed field coils 24 (not shown) positioned on pole pieces 16, 17, 18 and 19 is positioned within the bore of yoke member 2, as shown in Fig. 4, the pole piece member 3 is then rotated in a clockwise direction until the spiral surfaces 27 of the pole piece members 16, 17, 18 and 19 are respectively in engagement with the spiral surfaces 4, 5, 6 and 7 of the yoke member 2. It will be readily apparent that by virtue of the spiral configuration of yoke surfaces 4, 5, 6 and 7 and the outer ends 27 of pole pieces 16, 17, 18 and 19, clockwise rotation of the yoke member 3 will cause the outer ends of the pole pieces to become into increasingly tighter engagement with the spiral surfaces 4, 5, 6, and 7 of the yoke member 2. The machine may be so designed that the reaction torque tends to drive the pole piece member 3 into even tighter engagement with the yoke member 2 or in the alternative the pole piece member 3 and yoke member 2 may be stacked or otherwise secured together.

The pole piece member 3 may be rotated to a given position with respect to the yoke member 2, however, this rotation is preferably accomplished by means of a torque wrench or other similar device, shown schematically in dashed lines at 28 in Fig. 4. A suitable torque wrench may be provided having a cylindrical plug fitting in the bore 21 of pole piece member 3 with radial projections extending into the unoccupied portion of blading coil slots 22. The rotation is carried on in the direction 30 by means of torque wrench 28 until a predetermined amount of pressure is present between the interfering surfaces. In this way, a uniform degree of interference can be obtained regardless of the tolerances of the mating surfaces or the variations of the thickness and/or texture of the lamination material. Since the interference pressure is always uniform, distortion of the bore and stator is held to a minimum.

It will now be readily apparent that this invention provides an improved dynamoelectric stator machine assembly characterized by its elimination of the necessity for machining the pole piece member and by its ease of assembly and uniform results.

While I have shown and described a particular embodiment of this invention, further modifications and improvements will occur to those skilled in the art. I desire that it be understood therefore that this invention is not limited to the form shown and I intend in the appended claims to cover all modifications which do not depart from the spirit and scope of this invention.

What I claim as new and desire to secure by Letters Patent of the United States is:

1. A stator assembly for a dynamoelectric machine comprising an outer yoke member, and a pole piece member arranged within said yoke member, the inner periphery of said yoke member having a spiral surface formed thereon, said pole piece member including a pole piece having its outer end spiraled concentrically with and engaging said spiraled surface.

2. A stator assembly for a dynamoelectric machine comprising an outer yoke member, and a pole piece member arranged within said yoke member, the inner periphery of said yoke member having at least two spaced apart spiral surfaces formed thereon, said surfaces being spiraled in the same direction, said pole piece member having at least two spaced apart pole pieces with their inner ends being connected by bridging portions and with their outer ends being spiraled in the same direction concentrically with and respectively engaging said spiraled surfaces of said yoke member.

3. A stator assembly for a dynamoelectric machine comprising an outer yoke member, and a pole piece member arranged within said yoke member, the inner periphery of said yoke member having at least two diametrically opposite spiral surfaces formed thereon, said surfaces being spiraled in the same direction, said pole piece member having at least two diametrically opposite pole pieces with their inner ends being connected by bridging portions and with their outer ends being spiraled in the same direction concentrically with and respectively engaging said spiral surfaces of said yoke member.

4. A stator assembly for a dynamoelectric machine comprising an outer yoke member, and a pole piece member arranged within said yoke member, the inner periphery of said yoke member having a first pair of spaced apart spiral surfaces formed thereon and a second pair of spiral surfaces intermediate said first pair of spiral surfaces, said spiral surfaces being spiraled in the same direction, said pole piece member having two spaced apart pole pieces with their inner ends being connected by bridging portions and with their outer ends being spiraled in the same direction concentrically with and respectively engaging said first pair of spiral surfaces.

5. A stator assembly for a dynamoelectric machine comprising an outer yoke member, and a pole piece member arranged within said yoke member, the inner periphery of said yoke member having two spaced apart spiral surfaces formed thereon, said inner periphery having another spiral surface formed thereon intermediate said spaced apart surfaces, said spiral surfaces being spiraled in the same direction, said pole piece member having two spaced apart pole pieces with their inner ends being connected by bridging portions and with their outer ends being spiraled in the same direction concentrically with and respectively engaging said spaced apart surfaces.

6. A stator assembly for a dynamoelectric machine comprising an outer yoke member, and a pole piece member arranged within said yoke member, the inner periphery of said yoke member having two spaced apart spiral surfaces formed thereon, said inner periphery having another spiral surface and an arcuate surface intermediate said spaced apart surfaces, said spiral surfaces being spiraled in the same direction, said pole piece member having two spaced apart pole pieces with their inner ends being connected by bridging portions and with their outer ends being spiraled in the same direction concentrically with and respectively engaging said spaced apart surfaces.

7. A stator assembly for a dynamoelectric machine comprising an outer yoke member, and a pole piece member arranged within said yoke member, the inner periphery of said yoke member having a first spiral surface formed thereon, a second spiral surface adjacent said first surface, an arcuate surface adjacent said second spiral surface, and a third spiral surface adjacent said arcuate surface, said spiral surfaces being spiraled in the same direction, said pole piece member having two spaced apart pole pieces with their inner ends being connected by bridging portions and with their outer ends being spiraled in the same direction concentrically with and respectively engaging said first and third spiral surfaces.

8. A stator assembly for a dynamoelectric machine comprising an outer yoke member, and a pole piece member arranged within said yoke member, the inner periphery of said yoke member having a first four equally spaced spiral surfaces formed thereon and a second four equally spaced spiral surfaces intermediate said first four surfaces, said spiral surfaces being spiraled in the same direction, said pole piece member having four equally spaced pole pieces with their inner ends being connected by bridging portions and with their outer ends being spiraled in the same direction concentrically with and respectively engaging said first four spiral surfaces.

9. A stator assembly for a dynamoelectric machine comprising an outer yoke member, and a pole piece member arranged within said yoke member, the inner periphery of said yoke member having a first four equally spaced spiral surfaces formed thereon and a second four equally spaced spiral surfaces and four equally spaced arcuate surfaces intermediate said first four spiral surfaces, said spiral surfaces being spiraled in the same direction, said pole piece member having four equally spaced pole pieces with their inner ends being connected by bridging portions and with their outer ends being spiraled in the same direction concentrically with and respectively engaging said first four spiral surfaces.

References Cited in the file of this patent

UNITED STATES PATENTS

| | | |
|---|---|---|
| 2,172,191 | Denman | Sept. 5, 1939 |
| 2,460,921 | Candy | Feb. 8, 1949 |
| 2,565,530 | Smith | Aug. 28, 1951 |

FOREIGN PATENTS

| | | |
|---|---|---|
| 834,913 | France | Dec. 6, 1938 |